Dec. 11, 1928. 1,694,775
J. R. EDWARDS
BAIL EAR AND METHOD OF ATTACHING SAME
Filed April 23, 1924 2 Sheets-Sheet 2
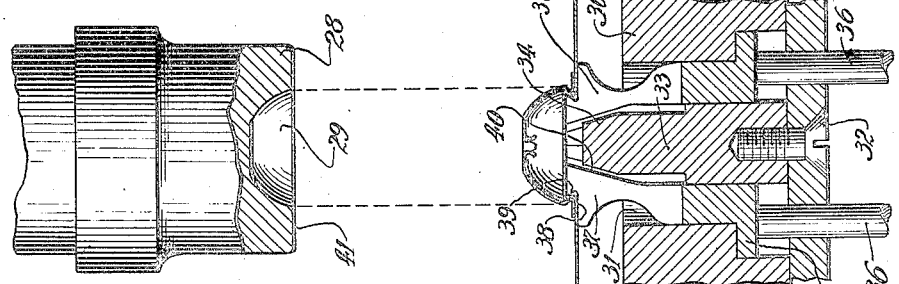
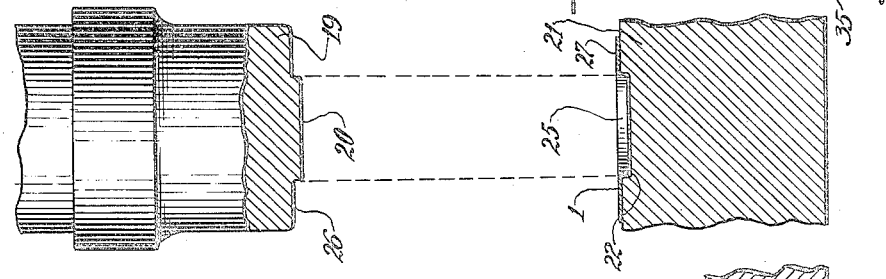
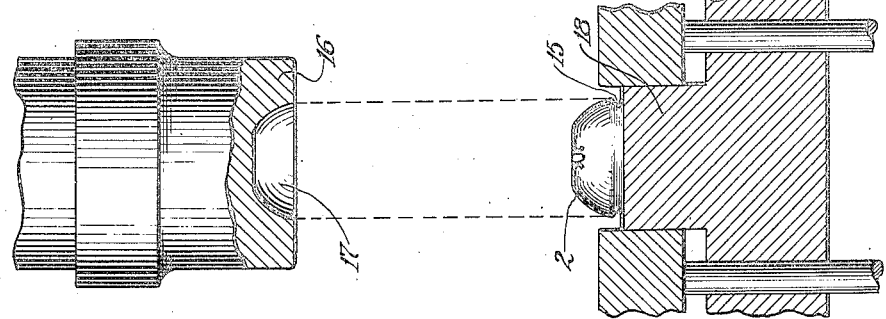
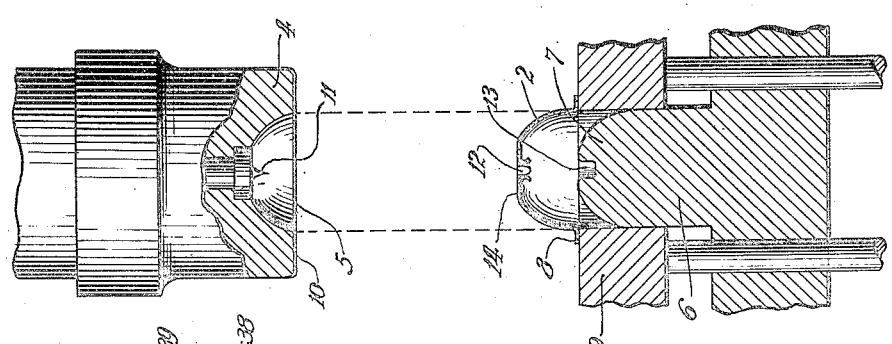
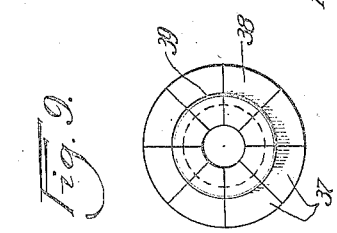
John Richard Edwards
INVENTOR.
BY Munday, Clarke &
Carpenter ATTORNEY Patented Dec. 11, 1928.

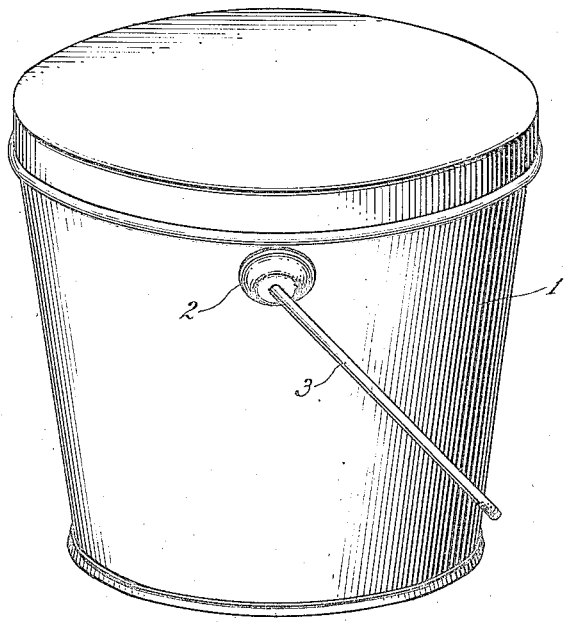
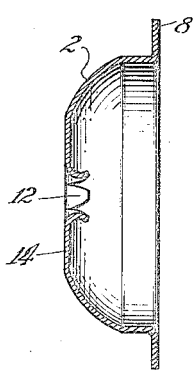
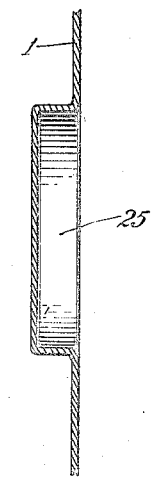
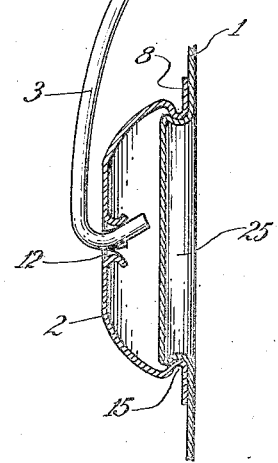

1,694,775

UNITED STATES PATENT OFFICE.

JOHN RICHARD EDWARDS, OF VANCOUVER, BRITISH COLUMBIA, CANADA, ASSIGNOR TO AMERICAN CAN COMPANY, OF NEW YORK, N. Y., A CORPORATION OF NEW JERSEY.

BAIL EAR AND METHOD OF ATTACHING SAME.

Application filed April 23, 1924. Serial No. 708,361.

The invention relates to bail ears for sheet metal vessels, such as lard pails and the like, and has particular reference to a method of manufacturing a bail ear and attaching the same to the body of the vessel without perforating the latter and which also dispenses with the use of solder, or similar attaching means.

The invention contemplates a process of manufacturing and attaching a bail ear by what may be termed a crimping method and is performed by suitable die members employed for the purpose and results in a bail ear which is firmly and permanently attached to the vessel.

With such objects in view, as well as other objects which are incident to the use of the improvement, the invention consists in the method and combinations thereof hereinafter set forth and claimed.

In order to make the invention more clearly understood, there are shown in the accompanying drawings means for carrying the same into practical effect, without limiting the improvements, in their useful application, to the particular method which, for the purpose of explanation, has been made the subject of illustration.

In said drawings:

Figure 1 is a view in perspective of a typical sheet metal vessel, such as a lard pail, showing the bail ear applied in accordance with the present invention and illustrating the bail attached thereto;

Fig. 2 is an enlarged vertical section showing the method of attaching the bail ear to the body of the vessel;

Fig. 3 is a similar view, illustrating the die formed depression in the vessel wall and before the final operation of crimping the bail into place thereon;

Fig. 4 is a view of the finished bail ear prior to its attachment to the portion of the vessel illustrated in Fig. 3;

Fig. 5 is a vertical sectional view of the die members employed in the first pressing operation to form and suitably perforate the bail ear;

Fig. 6 is a similar view of the die members which are employed to complete the formation of the ear;

Fig. 7 is a similar view, illustrating the die members employed to form the recessed projection on the vessel body;

Fig. 8 is a similar view, illustrating the die members employed to effectually apply the bail to the vessel body by a crimping operation; and Fig. 9 is a plan view of the expansion die members illustrated and employed in Fig. 8.

Referring to the drawings, 1 illustrates a desired sheet metal vessel, such as a lard pail, having an attached bail ear 2 manufactured and secured in place in accordance with the present improvements. 3 is the usual bail secured at its ends to the bail ear 2, as clearly illustrated in Fig. 2.

The bail ear 2 is first formed from an integral piece of sheet metal, as illustrated in Fig. 5. In this figure, the upper die 4 is provided with a semi-spherical recess 5 corresponding in size and configuration with the bail ear which is to be formed. The metal blank is forced into the recess 5 by the lower male die member 6, having a plunger 7 corresponding with the recess 5. The marginal portion of the bail ear blank is securely clamped between the stationary portion 9 of the lower die and the flattened portion 10 of the upper die in the operation of forming the ear and resulting in the annular horizontally extending flange 8 of the bail ear. The upper die 4 is further provided with a centrally disposed plunger. The plunger preferably has a sharp projection 11 thereon, which suitably perforates the bail ear, as at 12, when the latter is forced into a recess 5 by the plunger 6. A centrally disposed recess 13 is provided in the plunger 6 to accommodate the projection 11 after it has pierced the metal of the ear, and the flattened portion of the member having the projection 11 produces the flattened surface portion 14 of the bail ear when the latter is pressed into the recess 5.

Figure 6 illustrates the die members employed for flattening the bail ear and producing the annular recess forming an internal bead 15 thereon. As illustrated, the upper die member 16 is provided with a centrally disposed flattened recess 17, of sufficient size to snugly receive the perforated ear which is forced into said recess and flattened therein by the lower die member 18. The surplus metal resulting from the flattening of the bail ear is caused, by the pressure of the dies 16 and 18, to flow inwardly to form the internal bead 15 immediately adjacent the marginal flange of the completed bail ear.

Figure 7 illustrates an upper die member 19, having a central circular projection 20 adapted to cooperate with a lower die member 21, having a recess 22 into which the sheet metal 1 of the vessel body is forced, or caused to flow by the projection 20. This operation forms the circular recess which provides the outwardly extending bossed portion or projection 25 in the body of the vessel. The metal of the vessel body is prevented from becoming distorted by being yieldingly maintained between the horizontal flattened portions 26 and 27 of the upper and lower die members. As will be clearly seen from the drawings, the side walls of the projection 25 are at substantially right angles to the bottom thereof and the recess is of a diameter slightly smaller than the internal diameter of the internal bead 15 of the bail ear to permit the bail being placed in position to receive said outwardly recessed portion of the vessel body for the final crimping operation.

The method of crimping the bail to the vessel body is clearly illustrated in Fig. 8. In this figure, an upper die member 28, similar to the die 16, is provided with a flattened recess 29, similar to the recess 17 and which is adapted to receive the ear and prevent its becoming distorted during the crimping operation. The latter operation is best performed by the lower die member 30, having a centrally disposed preferably circular recess 31 in the center of which is secured, as by the screw 32, an upwardly projecting core member, or stud 33 suitably inclined or tapered at its upper end, as at 34. The recess 31 is further provided with an annular collar 35, enclosing the stud 33 and adapted to be vertically reciprocated with respect to said stud and the recess 31 by the stems 36. A plurality of segmentally formed expansion die members 37 are adapted to rest upon and project upwardly from the upper surface of the collar member 35 and are provided with inclined or tapered inner surfaces 40 adapted to cooperate with the inclined or tapered portion 34 of the stud 33 to crimp the ear in place upon the vessel body. To this end, each die member 37 is provided with the substantially horizontal flattened portion 38 and a necked overhanging projection 39. When the upper and lower die members 28 and 30 are brought together, the bail ear will be contained within the recess 29 and further movement of the main dies results in the expansion die members 37 and the collar 36 being forced downwardly, bringing the tapered portion 40 of the expansion members into engagement with the correspondingly tapered portion 34 of the central fixed stud 33. This results in the die members 37 being forced outwardly and the projections 39 force or spread the recessed portions of the vessel body outwardly to slightly overhang and tightly engage the internal bead 15 of the bail ear to firmly secure and crimp the latter into position on said vessel body. The marginal flange 8 of the bail ear is maintained tightly in position and prevented from spreading with the corresponding recessed portion of the body by the lower flattened surface portion of the upper portion 41 of the upper die member 28, securely binding the marginal portion against the flattened portions 38 of the expansion die members.

The various operations above described result in the rigid and permanent attachment of the bail ear to the vessel body without perforating the latter or soldering or otherwise securing the elements together, and the simplicity and effectiveness of the process described to produce the desired result will be apparent. After the bail has been attached to the vessel body, the bail 3 is attached in the usual manner through the aperture 12, as best illustrated in Fig. 2.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The method of forming sheet metal bail ears and attaching the same to sheet metal vessels, which consists in forming the wall of the vessel with an out-standing bossed portion, pressing the bail ear to concave shape with an outwardly extending marginal flange, pressing the bail ear to form therein an inwardly projecting bead at the inner part of said flange, applying the bail ear over the said bossed portion of the vessel, and expanding the outer part of the bossed portion within the bail ear so as to conform with and overlie said bead of the bail ear.

2. The combination of a vessel of bendable material having formed on its outside outwardly enlarged projections, and bail ears of concave form having edge flanges the inner parts of which embrace said projections and have their edges turned outward from said projections, said flanges of the bail ears being bent in the form of a bead which extends under the outer parts of said projections and is of a smaller diameter than that of the outer parts of said projections.

JOHN RICHARD EDWARDS.